March 31, 1970  J. P. CHERNOCH  3,504,295
OPTICALLY CLAD LASER
Filed Dec. 15, 1966
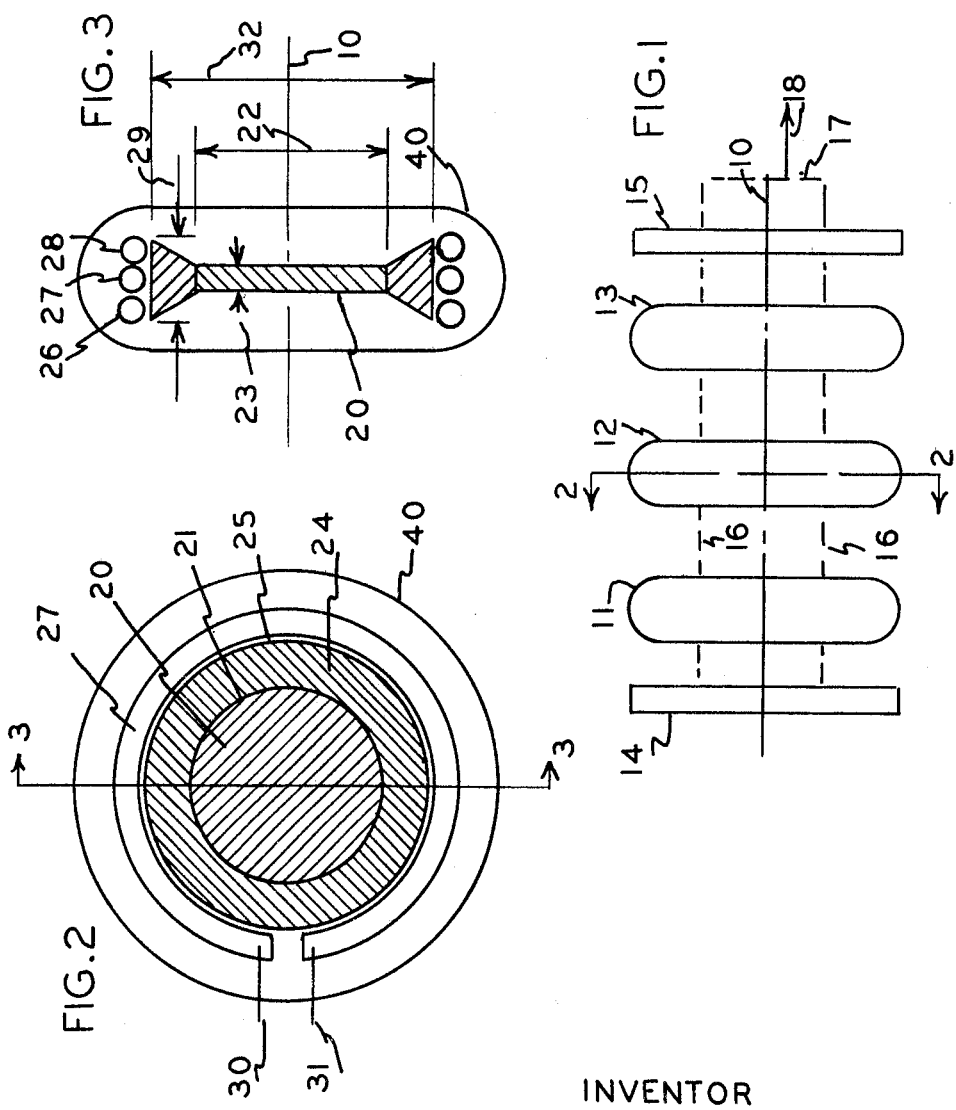
INVENTOR
JOSEPH P. CHERNOCH
BY
Richard J. Miller
ATTORNEY

United States Patent Office 3,504,295
Patented Mar. 31, 1970

3,504,295
OPTICALLY CLAD LASER
Joseph P. Chernoch, Scotia, N.Y., assignor, by mesne assignments, to the United States of America as represented by the Secretary of the Navy
Filed Dec. 15, 1966, Ser. No. 602,458
Int. Cl. H01s 3/00
U.S. Cl. 331—94.5                                    7 Claims

ABSTRACT OF THE DISCLOSURE

The invention disclosed in this application relates to a technique of immersion of a laser material in a cladding material that is particularly designed to enhance the ability of pumped light to reach a disk type laser to provide edge pumping.

---

This invention relates to an improved laser system and more particularly to a disc type laser which is optically immersed in a material of known index of refraction for increasing the light intensity pumped to a disc laser.

Since the advent of lasers many systems have been developed for the improvement of optical pumping of both rod and disc lasers. Yet much is left to be accomplished in this field. One of the great difficulties is to get sufficient energy in the pump band into the material that is to lase to bring it above threshold.

Therefore it is an object of this invention to provide an improved laser system wherein the active element is a disc shaped laser material that is optically immersed in a cladding material.

It is still a further object of this invention to provide an improved laser system, comprising: a first material capable of lasing having a first diameter, a first thickness, and a first index of refraction made of a laser material a second material cladding the first material having inner and outer peripheries and an outer diameter greater than the first diameter of the first material, and an inner diameter equal to the first diameters; a source of electromagnetic pump energy adjacent the outer periphery; and a reflective housing surrounding a portion of the pump energy source.

It is still a further object of this invention to provide an improved laser system wherein a laser disc is clad with a material of the composition of the laser material without the dopant ions which has a tapered shape for directing pump energy from a pump source to the disc for edge pumping the disc.

It is yet a further object of this invention to provide an improved laser system wherein a plurality of modules of laser amplifiers are provided which individually consist of disc lasers optically clad with a material about which are positioned pump sources within a reflective housing, said modules being positioned along an axis of propagation within a resonant cavity including a reflective end member and a partially reflective end member.

Yet another object of this invention is to provide an improved laser system wherein the cladding material has an inner diameter and an outer diameter, the inner diameter being equivalent to the outer diameter of the disc and the outer diameter being equal to the inner diameter multiplied by the index of refraction.

It is yet a further object of this invention to provide an optically immersed clad laser disc wherein the material for cladding has an inner thickness equivalent to the thickness of the disc and an outer thickness equivalent to the inner thickness multiplied by the index of refraction.

Other objects, advantages and novel features of the invention will become apparent from the following detailed description of the invention when considered in conjunction with the accompanying drawings wherein:

FIGURE 1 shows a side view of a three module laser system utilizing this invention;
FIGURE 2 is a sectional view along lines 2—2 in FIGURE 1; and
FIGURE 3 is a sectional view along lines 3—3 in FIGURE 2.

FIGURE 1 shows three units or modules of the improved optically immersed disc laser system positioned along an axis 10. The three units 11, 12, and 13 are substantially equally spaced along axis 10 and positioned between a totally reflecting mirror 14 and a partially reflecting mirror 15. The dashed lines 16 represent the direction of propagation of a laser beam and the dashed line 17 shows a wave front of the beam generated in the direction 18.

FIGURE 2 shows in more detail the construction of module 12 of FIGURE 1. A disc laser material 20 having an outer periphery 21 has a diameter 22, shown more clearly in FIGURE 3, and a first thickness 23. Optically clad to the periphery 21 is a material 24 which serves to optically immerse the disc 20 as hereinafter disclosed. The outer periphery of material 24, designated 25, is closely adjacent to a plurality of pump lights 26, 27, 28, and cladding 24 has a first thickness equivalent to 23 at its inner periphery and a second thickness 29 at the outer periphery. A pair of leads 30, 31, shown schematically in FIGURE 2, are coupled to a power source not shown for energizing the lamps 26, 27, and 28 to produce light energy in the pumping band of the material or disc 20. In the embodiment shown ruby is used for the disc 20 and sapphire for the cladding material 24. It is to be understood however, that other materials that can be formed in disc configuration and cladded will equally work in the structure shown. The diameter 32 of material 24 is selected in the following manner. The ruby, in this case, a disc of approximately 1 inch in thickness and 6 inches in diameter has an index of refraction which is approximately 1.76. The outer diameter 32 is selected to bear the relationship 1.76 times diameter 22. In addition, the outer thickness 29 of the cladding material is 1.76 times the thickness 23.

The outer shell 40 has an inner surface which is reflective and serves to additionally pump the disc 20.

In operation, the individual modules of FIGURE 1 are pumped and the radiation pattern is such that the energy which is produced by the disc, that is laser energy or light at a given frequency is generated in the cavity and propagated through the partially reflected mirror 15.

The lamps 26, 27, 28 when energized cause pump energy to travel in all directions away from themselves. The cladding material 24 closely adjacent to the lamp receives a large portion of this energy and directs it to the disc 20 by internal reflection and refraction. The light going in a direct line to the disc is not hindered in getting there, the light entering the cladding at an angle from the air is refracted more towards the plane of the disc and will be used to further pump the disc.

Obviously many modifications and variations of the present invention are possible in the light of the above teachings. It is therefore to be understood that within the scope of the appended claims the invention may be practiced otherwise than as specifically described.

I claim:
1. An improved laser system, comprising:
    (a) a first material capable of lasing having a first diameter, a first thickness, and a first index of refraction;
    (b) a second material cladding said first material having an inner and outer periphery and an outer diameter greater than said first diameter of said material and an inner diameter equal to said first diam- eter, said second material has said first thickness at said inner periphery and a second thickness at said outer periphery which is greater than said thickness of said inner periphery;

(c) a source of electromagnetic pump energy adjacent said outer periphery; and (d) a reflective housing partially surrounding said source of pump energy for directing additional portions of said energy to said first material.

2. The device of claim 1 wherein the outer thickness is equal to the inner thickness multipled by the index of refraction of said second material.

3. The device of claim 2 wherein said outer diameter is equal to said inner diameter multipled by the index of refraction of said second material.

4. The device of claim 3 wherein said index of refraction of said first material is equivalent to the index of refraction of said second material.

5. The device of claim 4 wherein said first material has a disk shape wherein said diameter is at least twice as great as said first thickness.

6. The device of claim 5 wherein said disk has an axis of propagation of laser light which is substantially normal to the plane of the disk.

7. The system of claim 6 wherein said reflective housing surrounds said pump source and said first and second material and has first and second openings therein to allow laser light to propagate along said axis of propagation.

References Cited

UNITED STATES PATENTS

| | | | |
|---|---|---|---|
| Re. 26,420 | 7/1968 | Wanlass | 331—94.5 |
| 3,297,958 | 1/1967 | Weiner. | |
| 3,354,404 | 11/1967 | Boyle et al. | 331—94.5 |
| 3,356,966 | 12/1967 | Miller | 331—94.5 |
| 3,414,835 | 12/1968 | Miller | 331—94.5 |
| 3,087,374 | 4/1963 | Devlin et al. | 331—94.5 |

RONALD L. WIBERT, Primary Examiner

P. K. GODWIN, JR., Assistant Examiner